(12) United States Patent
Boesjes (10) Patent No.: US 7,657,249 B2
(45) Date of Patent: *Feb. 2, 2010

(54) DISTRIBUTED WIRELESS ONLINE ACCESS SYSTEM

(76) Inventor: Eimar M. Boesjes, 1754 Moonshadow, Eugene, OR (US) 97405

( * ) Notice: Subject to any disclaimer, the term of this patent is extended or adjusted under 35 U.S.C. 154(b) by 271 days.

This patent is subject to a terminal disclaimer.

(21) Appl. No.: 11/298,558

(22) Filed: Dec. 9, 2005

(65) Prior Publication Data

US 2006/0148447 A1 Jul. 6, 2006

Related U.S. Application Data

(63) Continuation of application No. 10/393,584, filed on Mar. 21, 2003, now Pat. No. 6,975,851, which is a continuation of application No. 09/715,705, filed on Nov. 17, 2000, now Pat. No. 6,553,218.

(51) Int. Cl.
*H04M 11/00* (2006.01)
(52) U.S. Cl. .................. 455/406; 455/407; 455/408; 379/114.03; 379/114.05; 379/114.28
(58) Field of Classification Search ......... 455/406–408, 455/414.1, 418–420; 370/351, 352; 379/114.03–114.05, 379/124.28–124.29, 115.01
See application file for complete search history.

(56) References Cited

U.S. PATENT DOCUMENTS

| | | | | | |
|---|---|---|---|---|---|
| 6,484,150 | B1* | 11/2002 | Blinn et al. | .................... | 705/26 |
| 6,704,031 | B1* | 3/2004 | Kimball et al. | ............. | 715/745 |
| 6,754,485 | B1* | 6/2004 | Obradovich et al. | ..... | 455/414.1 |
| 6,766,301 | B1* | 7/2004 | Daniel et al. | ................... | 705/14 |
| 6,868,399 | B1* | 3/2005 | Short et al. | .................... | 705/34 |
| 6,956,833 | B1* | 10/2005 | Yukie et al. | ................. | 370/328 |
| 7,027,773 | B1* | 4/2006 | McMillin | ................... | 455/41.2 |
| 2002/0062270 | A1* | 5/2002 | Star | ........................... | 705/36 |

FOREIGN PATENT DOCUMENTS

| | | |
|---|---|---|
| WO | WO-97-25826 A1 | 7/1997 |
| WO | WO-99-05829 A1 | 2/1999 |
| WO | WO-00-24161 A1 | 4/2000 |

\* cited by examiner

*Primary Examiner*—CongVan Tran
(74) *Attorney, Agent, or Firm*—David S. Alavi (57) ABSTRACT

A method for providing wireless online access comprises: establishing a wireless access signal space wherein a wireless communications link is established between a secondary wireless unit and at least one primary wireless unit, thereby providing a corresponding secondary subscriber with online access by data packet transmission between the primary wireless unit and the secondary wireless unit; and receiving, from an online access provider, a credited revenue amount in return for providing online access for the secondary subscriber.

24 Claims, 4 Drawing Sheets

DISTRIBUTED WIRELESS ONLINE ACCESS SYSTEM

RELATED APPLICATIONS

This application is a continuation of U.S. non-provisional application No. 10/393,584 filed Mar. 21, 2003 (now U.S. Pat. No. 6,975,851 issued Dec. 13, 2005), which is a continuation of U.S. non-provisional application No. 09/715,705 filed Nov. 17, 2000 (now U.S. Pat. No. 6,553,218 issued Apr. 22, 2003). Each of said patents and applications is hereby incorporated by reference as if fully set forth herein.

BACKGROUND

The field of the present invention relates to wireless telecommunications. In particular, apparatus, systems, and methods are described herein for providing distributed wireless online access, along with business methods for deploying such a system.

With the recent explosive growth of the Internet and accompanying demand for high-speed online access, the so-called "last-mile problem" has assumed great importance in the telecommunications industry. The "last-mile" problem refers to the technical and economic difficulties associated with bringing high-speed online access and/or data transmission to each and every business, residence, and other location. High-speed data transmission is already provided on the Internet backbone, and many large entities (corporations, telecommunications companies, universities, research institutions, computing facilities, online service providers, electronic commerce providers, and so on) have direct connections or links to the Internet backbone, thereby enjoying data transmission rates of up to 100 Mb/s. Most residences and smaller businesses rely on direct connections using modems and standard telephone lines for online access, typically at maximum data transmission rates of 56 kb/s. There has been some headway made in providing more widely deployed and higher speed online access, mainly through television cable systems and digital subscriber lines (DSL's) provided by phone companies, but high-speed online access is still quite limited, and may never be deployed in some areas. The potential infrastructure development required to widely deploy high-speed online access may prove to be enormous, and may be particularly problematic in established neighborhoods.

Wireless communications technology may provide alternative solutions to the "last mile problem". Relatively low-cost devices are available for wirelessly linking devices, and if these were widely deployed a wireless network could be formed breaching the gap between the Internet backbone and a multitude of individual local users. This could be accomplished without significant infrastructure development or disruption of existing systems or structures. Wireless network connections also offer the possibility of mobile connections to the network, or even the network itself being mobile.

It is therefore desirable to provide apparatus and methods for widely deploying/providing high-speed wireless online access that does not entail substantial infrastructure development and/or investment. It is therefore desirable to provide apparatus and methods for widely deploying/providing high-speed wireless online access that may be readily implemented in existing neighborhoods without substantial disruption of existing structures, facilities, and/or services. It is therefore desirable to provide apparatus and methods for widely deploying/providing high-speed wireless online access that may be readily expanded into un-served geographic areas. It is therefore desirable to provide apparatus and methods for deploying/providing high-speed wireless online access that is affordable for users and that may generate substantial revenue streams with minimal initial investment. It is therefore desirable to provide apparatus and methods for deploying/providing high-speed wireless online access having mobile network elements and/or links, thereby enabling implementation of a mobile network.

SUMMARY

Certain aspects of the present invention may overcome one or more aforementioned drawbacks of the previous art and/or advance the state-of-the-art of wireless online access systems and methods, and in addition may meet one or more of the following objects:

To provide distributed wireless online access system and methods for providing widely-deployed high-speed online access;

To provide distributed wireless online access system and methods for providing widely-deployed high-speed Internet access;

To provide distributed wireless online access system and methods for providing widely-deployed high-speed wireless communications;

To provide distributed wireless online access system and methods for providing widely-deployed high-speed wireless online access;

To provide distributed wireless online access system and methods for providing widely-deployed high-speed wireless Internet access;

To provide distributed wireless online access system and methods wherein a plurality of primary wireless units form a primary wireless network;

To provide distributed wireless online access system and methods wherein a plurality of secondary wireless units are wirelessly linked to the primary wireless network via one or more of the primary wireless units;

To provide distributed wireless online access system and methods wherein one or more of the wireless units may be linked to an external communications system (such as the Internet), thereby enabling connection of the primary wireless network to the external communications system;

To provide distributed wireless online access system and methods wherein one or more of the wireless units may be directly linked (i.e., wired) to an external communications system (such as the Internet), thereby enabling connection of the primary wireless network to the external communications system;

To provide distributed wireless online access system and methods wherein the wireless units comprising the system may include unlicensed wireless transmitters;

To provide distributed wireless online access system and methods wherein data packets may be transmitted from one wireless unit of the wireless network to another wireless unit thereof via multiple network paths through the wireless network;

To provide distributed wireless online access system and methods wherein data packet transmission through the wireless network may be routed and/or re-routed based on the status of the wireless network, the status of wireless units thereof, and the speed of data packet transmission therethrough;

To provide distributed wireless online access system and methods wherein patterns of geographic coverage and/or data packet transmission may be used to determine placement of additional primary wireless units for expanding the primary wireless network;

To provide distributed wireless online access system and methods wherein online access subscribers having primary or secondary wireless units may be charged an access fee amount for access to and/or use of the primary wireless network;

To provide distributed wireless online access system and methods wherein the access fee amount for primary and/or secondary users may be calculated based on volume of received and/or transmitted data packets;

To provide distributed wireless online access system and methods wherein access provider revenue may be paid to a primary subscriber based on the volume of received and re-transmitted data packets routed through the respective primary wireless unit;

To provide distributed wireless online access system and methods wherein access provider revenue may be paid to primary subscribers based on the number of secondary wireless units linked to the respective primary wireless unit;

To provide distributed wireless online access system and methods wherein access provider revenue may be paid to primary subscribers based on the number of other subscribers recruited by the primary subscriber;

To provide distributed wireless online access system and methods wherein some of the wireless units may be mobile;

To provide distributed wireless online access system and methods wherein some of the wireless units may be mounted on motor vehicles; and To provide distributed wireless online access system and methods wherein multiple wireless units mounted on multiple motor vehicle traveling on a portion of a length of roadway may form a transient wireless communications network.

One or more of the foregoing objects may be achieved in the present invention by a distributed wireless online access system comprising a plurality of primary wireless units forming primary wireless communications network, and a plurality of secondary wireless units. Each primary wireless unit may comprise a wireless transmitter, a wireless receiver, and a programmed processor for routing data packets received by the primary wireless unit for re-transmission to another primary wireless unit or to a secondary wireless unit. Each secondary wireless unit may comprise a wireless transmitter, a wireless receiver, and a programmed processor for processing received data packets and for generating transmitted data packets. A portal unit may provide a connection or link between the primary wireless network and an external communications system (such as the Internet), thereby providing access to the external communications network to all primary and secondary wireless units. Data packets may be generated by an originating secondary wireless unit, transmitted to a primary wireless unit, routed and re-transmitted through a succession of other primary wireless units, and ultimately received by a destination unit (either a destination secondary wireless unit or a portal unit/external communications system). A data packet may follow one of several alternative network paths through the primary network connecting the originating point and the destination point, thereby enabling the system to route data packets around unavailable primary units, slower portions of the primary network, and soon.

A preferred embodiment for a primary or a secondary receiver is a personal computer (desktop or portable) connected to a wireless transmitter and a wireless receiver. The transmitter and receiver may comprise separate units, or may be incorporated into a single unit, which may in turn be incorporated into the computer or may comprise a separate unit(s) connected thereto. It should be noted that a given computer/transmitter/receiver combination may function as both a primary wireless unit and as a secondary wireless unit. The primary and secondary wireless units may operate as licensed or as unlicensed wireless devices under any applicable government regulations in force at the location of the unit, or the plurality of primary and secondary units may be a combination of licensed and unlicensed wireless units. Unlicensed wireless transmitters/receivers currently available commercially are relatively inexpensive and typically operate at about 4 to 6 megabits/second (Mb/s) up to about 11 Mb/s, about two orders of magnitude faster than typically modem/phone line computer network access (currently 56 kb/s or less).

This combination of relatively inexpensive hardware, high-speed data transmission, and lack of licensing requirements together enable potentially powerful business methods for deploying, maintaining, and expanding a commercial high-speed communications system for a group of subscribers, and generating revenue therefrom for a wireless online access provider. Briefly, the online access provider establishes a portal unit with a link (typically a high-speed wired link) to the Internet (or other external communications system) and deploys primary wireless units at the geographic locations (businesses, residences, or other locations) of a group of primary subscribers. The primary wireless units are preferably deployed in a sufficiently dense pattern over a given geographic area that all primary wireless units are within transmission range of at least one other primary unit, preferably more than one. At least one unit must be within transmission range of the portal unit, thereby enabling data packet transmission between the Internet and any primary wireless unit of the primary wireless network. Primary subscribers may be specifically recruited based on geographic location, or may be self-selected. The wireless transmitters, wireless receivers, and/or computers for the primary wireless units may be purchased by the subscriber, supplied by the provider (for a fee or free of charge), or some combination thereof. A subscriber-supplied computer and provider-supplied wireless transmitter/receiver might be a common scenario. A primary subscriber may be charged an access fee to participate in the primary wireless network and receive high-speed access to the Internet through the primary wireless network, with his/her primary wireless unit (i.e., computer/transmitter/receiver) also functioning as a secondary wireless unit.

Secondary wireless units of the system may be regarded as "clients" connected to the primary wireless network for providing user access to the primary wireless network and the Internet (through the portal unit). Secondary subscribers may be solicited by the provider, and charged an access fee for the high-speed Internet access provided by the wireless linkage of their secondary wireless units to the primary wireless network. The secondary wireless unit may be user-supplied, provider-supplied, or a combination (as described above). A secondary wireless unit may be deployed in any location (business, residence, or other) within transmission range of at least one primary wireless unit.

Expansion of the system may be driven by financial incentives to the subscribers. A primary subscriber may receive rebates, access fee reductions, and/or payments based on the number of secondary wireless units within transmission range of his/her primary wireless unit, or alternatively based on the volume of in-transit data packets received and re-transmitted (i.e., amount of data traffic handled) by his/her primary wireless unit. Incentives may therefore be provided for driving self-organized/self-assembled expansion of the distributed high-speed wireless network, particularly at the edges of areas covered by the primary wireless network. As new primary subscribers are recruited (or secondary subscribers decide to finance their high-speed Internet access by becoming a primary subscriber), the area covered by the wireless network may expand and/or becomes more redundantly covered (enhancing reliability).

One or more of the wireless units may be mobile wireless units. A mobile secondary wireless unit essentially allows a secondary subscriber to "roam" among the individual wireless coverage areas of multiple primary units while maintaining a link to the primary wireless network. One or more mobile primary units may enable formation of a transient, mobile primary wireless network having a dynamically varying network topology and coverage area. Installing primary units on sufficiently large fraction of the vehicles on a portion of a roadway may effectively transform an interstate highway into a long-haul, high-speed online access "backbone" for transmitting data packets over long distances, or effectively transform congested commuter routes into a metro-scale high-speed online access system serving a city and its surrounding suburbs.

Additional objects and advantages of the present invention may become apparent upon referring to the preferred and alternative embodiments of the present invention as illustrated in the drawings and described in the following written description and/or claims.

DETAILED DESCRIPTION OF EMBODIMENTS

For purposes of the present written description and/or claims, the term "online access" shall denote an activity which is performed by sending and/or receiving text, data, graphics, images, commands, requests, queries, and so forth over a communications network through an interface device. This will preferably mean using a computer connected to the Internet, but may also include other interface devices (including but not limited to: computers, workstations, terminals, televisions, wireless devices, hand-held or "palm-top" devices, electronic organizers, telephones, wireless telephones, messaging units, and the like; combinations thereof; and/or functional equivalents thereof) and other networks (Internet, Internet 2, next-generation Internet, other successors to the Internet, World-Wide Web, telephone networks, local- or wide-area networks, wireless networks, optical networks, satellite-based networks, and the like; combinations thereof; and/or functional equivalents thereof). The connection or link between the interface device and the communications network may be direct (i.e., hard-wired, or wired) or indirect (i.e., wireless, or through an intervening network). It is this latter scenario that is the primary subject matter of the present invention.

For purposes of the present written description and/or claims, "wireless transmitter" and "wireless receiver" shall generally denote devices which may send and receive, respectively, signals that propagate through free space in the form of electro-magnetic radiation. The electro-magnetic radiation is typically in the RF or microwave region, although other portions of the electromagnetic spectrum may be utilized as well. For purposes of the present written description and/or claims, a "wireless connection" or a "wireless link" is a connection or link utilizing wireless transmitters and receivers. For purposes of the present written description and/or claims, a "hard-wired", "wired", or "direct" connection or link shall denote a connection or link in which a signal is propagated along a transmission device of some sort, for example electronic signals propagating along a wire or cable, or an optical signal propagating along an optical fiber.

Figure 1:
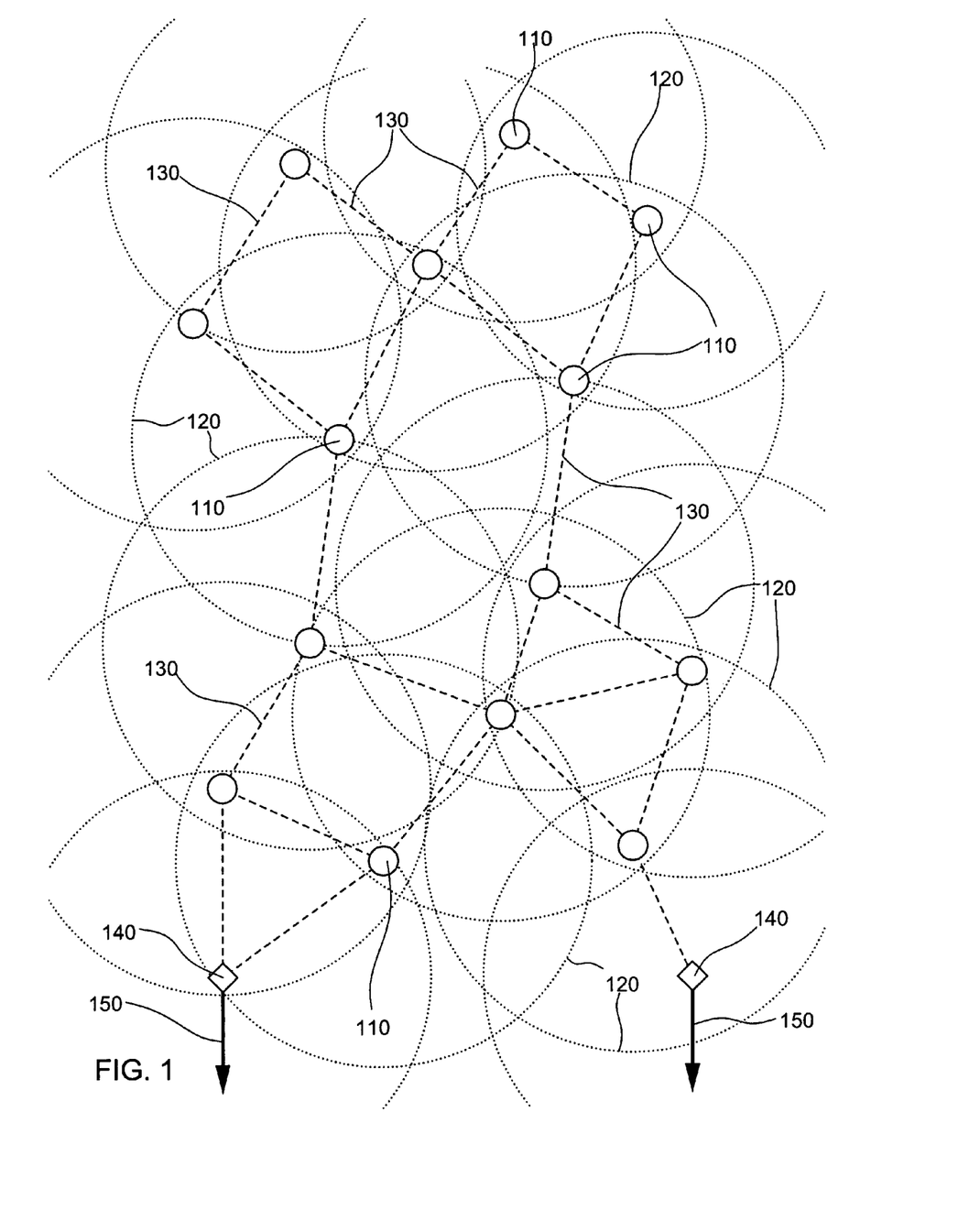
FIG. 1 shows a schematic diagram of a primary wireless network.

FIG. 1 shows a schematic diagram of a primary wireless network according to the present invention, comprising a plurality of primary wireless units 110. Each wireless unit 110 is shown at the center of a circle 120 representing the maximum transmission range of each primary wireless unit 110. Primary wireless units 110 are preferably deployed geographically so that each primary wireless unit 110 is within the maximum wireless transmission range of at least one other primary wireless unit 110, thereby forming primary wireless links represented by dashed lines 130 in FIG. 1. Primary wireless units 110 and lines 130 form the nodes and links, respectively, of a primary wireless network. The primary wireless network may be provided with one or more portal units 140, which in turn provide external links 150 between the primary wireless network and an external communications system (external links 150 represented by heavy arrows of FIG. 1; external communications system not shown). Each primary wireless unit 110 therefore has access to the external communications system through the primary wireless network, a portal unit 140, and a link 150.

Each primary wireless unit preferably comprises: a wireless receiver for receiving a data packet transmitted from at least one other of the plurality of primary wireless units; a wireless transmitter for transmitting a data packet to at least one other of the plurality of primary wireless units; and a processing unit programmed for routing a received in-transit data packet for transmission to another of the plurality of primary wireless units. Each data packet preferably includes routing information, and this routing information may be processed by the primary wireless unit to determine which other primary wireless unit is the next destination for the data packet. Each primary wireless unit at a node of the primary wireless network therefore functions as a router for the primary wireless network. The routing is preferably implemented dynamically, meaning that which of multiple available routes may be chosen may be based on information that may be changing with time, such as primary unit availability or primary unit transient reception/transmission speed. In a typical implementation of the present invention, a primary wireless unit may comprise a personal computer (desktop or portable) with wireless transmitter and receiver hardware connected thereto. The transmitter and receiver may be separate units or integrated as a single unit, and whether separate from or integrated with one another may be separate from and connected to the computer or may be integrated into the computer. Other functionally equivalent embodiments of a primary wireless unit transmitter/receiver/processor combination may be employed.

Each portal unit may preferably comprise a link to the external communications system for transmitting data packets to the external communications system and for receiving data packets transmitted from the external communications system, a wireless transmitter for transmitting data packets to a primary wireless unit of the primary wireless network, and a wireless receiver for receiving data packets transmitted from a primary wireless unit of the primary wireless network. Any suitable link to the external communications system may be employed, and the link may typically comprise a wired, high-speed link or connection to the external communications system. In a common implementation of the present invention, the external communications system comprises the Internet, and the link to the external communications comprises a direct (i.e., wired) high-speed connection to the Internet backbone, thereby enabling distributed, high-speed wireless online access to the Internet through any of the primary wireless units of the primary wireless network. In a typical implementation of the present invention, the portal unit may comprise a server computer with connected wireless transmitter and receiver (as separate connected units or integrated with the server) and high-speed network interface hardware for connecting directly to the Internet backbone. Other functionally equivalent embodiments of a portal unit transmitter/receiver/processor/network interface combination may be employed. A single transmitter/receiver/processor combination may serve as both a portal unit and a primary wireless unit.

Figure 2:
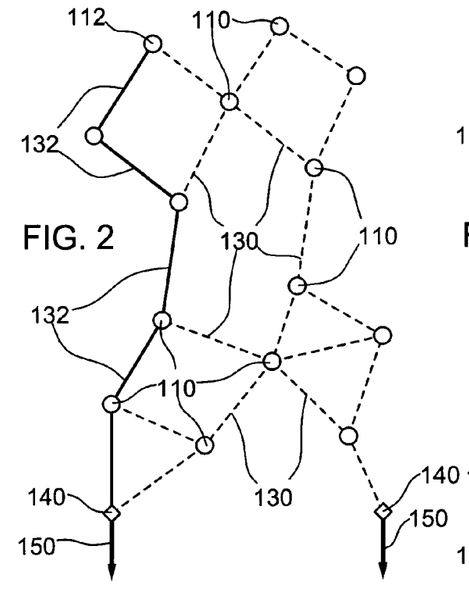
FIG. 2 shows a schematic diagram of a primary wireless network.
Figure 3:
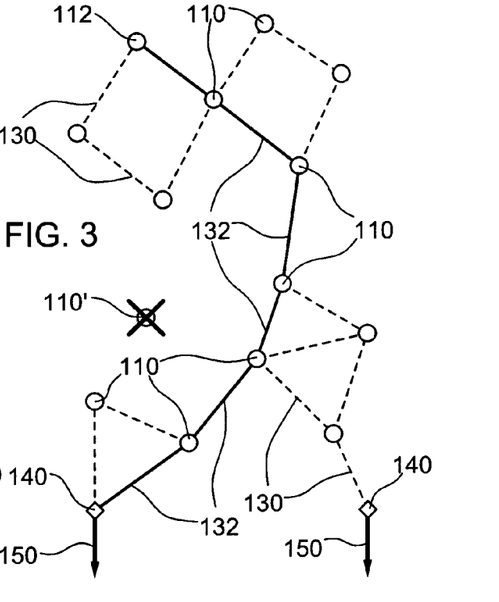
FIG. 3 shows a schematic diagram of a primary wireless network.
Figure 4:
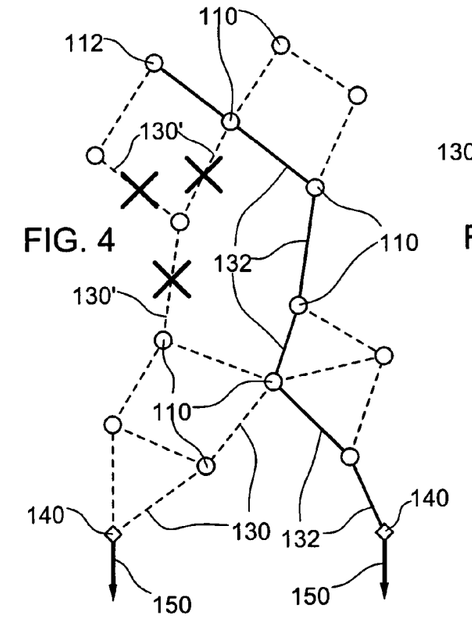
FIG. 4 shows a schematic diagram of a primary wireless network.
Figure 5:
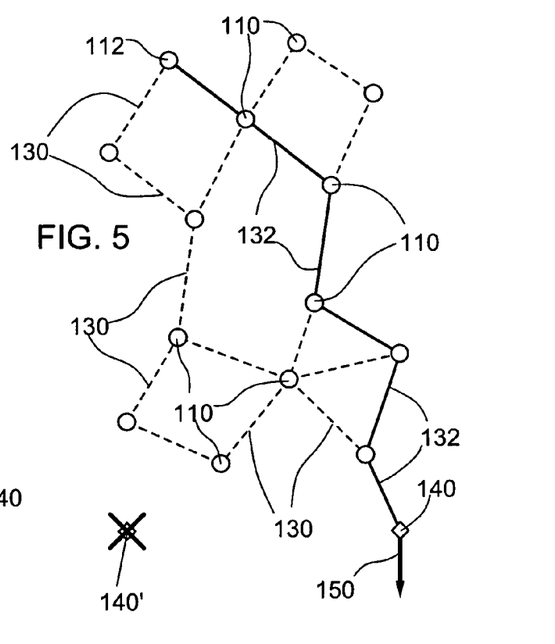
FIG. 5 shows a schematic diagram of a primary wireless network.

The plurality of primary wireless units forming the primary wireless network may preferably be sufficiently densely distributed geographically (relative to the maximum transmission range) that most of the primary wireless units are linked to at least two other primary wireless units. In this way the resulting primary wireless network may provide multiple network paths connecting pairs of primary wireless units within the network. This redundancy enhances the overall reliability of the primary wireless network in the event that nodes and/or links in the network become non-functional. In this event data packet traffic may be re-routed through the network around the disruption. FIG. 2 shows a fully operation primary wireless network comprising primary wireless units 110 and 112 (circles), wireless network links 130 (dashed lines) and 132 (solid lines), portal units 140 (diamonds), and external (Internet) links 150 (heavy arrows). A data packet may be transmitted from a particular primary wireless unit 112, for example, through selected network links 132 (solid lines) to the Internet through one of the portal units 140 and Internet links 150. FIG. 3 show how the data packet might be re-routed in the event that one of the other primary wireless units 110' should become non-operational (hardware and/or software malfunction, power outage, unplugged, turned off, and so forth). A different set of selected links 132 may be utilized to transmit the data packet through the primary wireless network to the Internet through one of the portals 140 and link 150. In FIG. 4, several of the primary wireless network links 130' are shown as unavailable, perhaps due to high data packet traffic and/or slow transmission speed, for example. A data packet from primary wireless unit 112 may again be re-routed through a different set of selected wireless links 132 of the primary wireless network to a portal 140 and thence to the Internet. FIG. 5 illustrates a scenario in which one of the portal units 140' (or equivalently, its corresponding external link) has become non-functional (hardware and/or software malfunction, power outage, unplugged, turned off, and so forth). Once again, a data packet from a primary wireless unit 112 may be re-routed through a different set of selected wireless links 132 to another portal 140 and link 150, and thence to the Internet. Each of FIGS. 2 through 5 would equivalently apply to a data packet moving from the Internet to primary wireless unit 112. Programming techniques enabling such dynamic re-routing of data packets through a network are well-known and widely used to control the flow of data packets throughout the Internet itself. Such extant programming/routing techniques and protocols may be readily adapted for use in the present invention, or new techniques and protocols may be developed and implemented without departing from inventive concepts disclosed and/or claimed herein. The programmed processor of each primary wireless unit 110 may perform the routing function required to properly route a data packet from its origin through the primary wireless network to its destination, based on routing information in the data packet itself, based on commands from an administration unit of the distributed wireless online access system (described further hereinbelow), and/or based on other relevant information.

The distributed wireless online access system may further comprise an administration unit for performing the routing and/or re-routing of data packet transmission through the primary wireless network as described hereinabove. The administration unit may comprise: a wireless transmitter for transmitting queries and/or commands to primary wireless units; a wireless receiver for receiving wireless unit status data, wireless network status data, data packet transmission data, other query acknowledgements, and/or command acknowledgements from wireless units; a programmed processor for generating commands and/or queries and processing wireless unit status data, wireless network status data, data packet transmission data, other query acknowledgements, and/or command acknowledgements from wireless units. In a typical implementation of the present invention, the administration unit may comprise a computer with connected wireless transmitter and receiver (as separate connected units or integrated with the server). Other functionally equivalent embodiments of a portal unit transmitter/receiver/processor combination may be employed. A single transmitter/receiver/processor combination may serve as both an administration unit and a primary wireless unit, as both an administration unit and a portal unit, or as all three (primary, portal, and administration). Routing information may be generated by the administration unit based on wireless unit/network status and the origin/destination of a data packet for selecting a particular network path for a data packet. Alternatively, such routing information may be generated locally by each primary wireless unit as the data packet makes its way through the primary wireless network. In this case, the plurality of primary wireless units collectively may function as an administration unit.

Access to the primary wireless network, and hence to the Internet (i.e., an external communications system) is preferably provided through a plurality of secondary wireless units, each comprising: a wireless receiver for receiving a data packet transmitted from a primary wireless unit; a wireless transmitter for transmitting a data packet to a primary wireless unit; and a programmed processing unit for generated a data packet to be transmitted and for processing a received data packet. Some or all of the primary wireless units may comprise transmitters/receivers for transmitting/receiving data packets to/from secondary units. These transmitters/receivers will typically be the same transmitters/receivers employed for implementing the primary wireless network as described hereinabove, although it may be possible and/or desirable to employ separate transmitters/receivers for wireless links between a given primary wireless unit and i) another primary wireless unit and ii) a secondary wireless unit. A user desiring online access to the primary wireless network and hence the Internet may do so by utilizing a secondary wireless unit, typically using a user interface. A graphical user interface (GUI) may be particularly well-suited for facilitating user online access through the secondary wireless unit. In a typical implementation of the present invention, a secondary wireless unit may comprise a personal computer (desktop or portable) with wireless transmitter and receiver hardware connected thereto. The transmitter and receiver may be separate units or integrated as a single unit, and whether separate from or integrated with one another may be separate from and connected to the computer or may be integrated into the computer. Other functionally equivalent embodiments of a primary wireless unit transmitter/receiver/processor combination may be employed. It should be noted that the primary differences between the primary wireless units and the secondary wireless units are: 1) the primary wireless units require routing/re-transmission functionality in order to handle in-transit data packets and enable transmission of data packets through the primary wireless network; while 2) the secondary wireless units are typically origination and/or destination points for data packets, and as such require no routing/re-transmission functionality, but rather require data packet generation and processing/interpretation capabilities, along with user-interface functionality. However, a single transmitter/receiver/processor combination may function as both a primary wireless unit and a secondary wireless unit.

Figure 6:
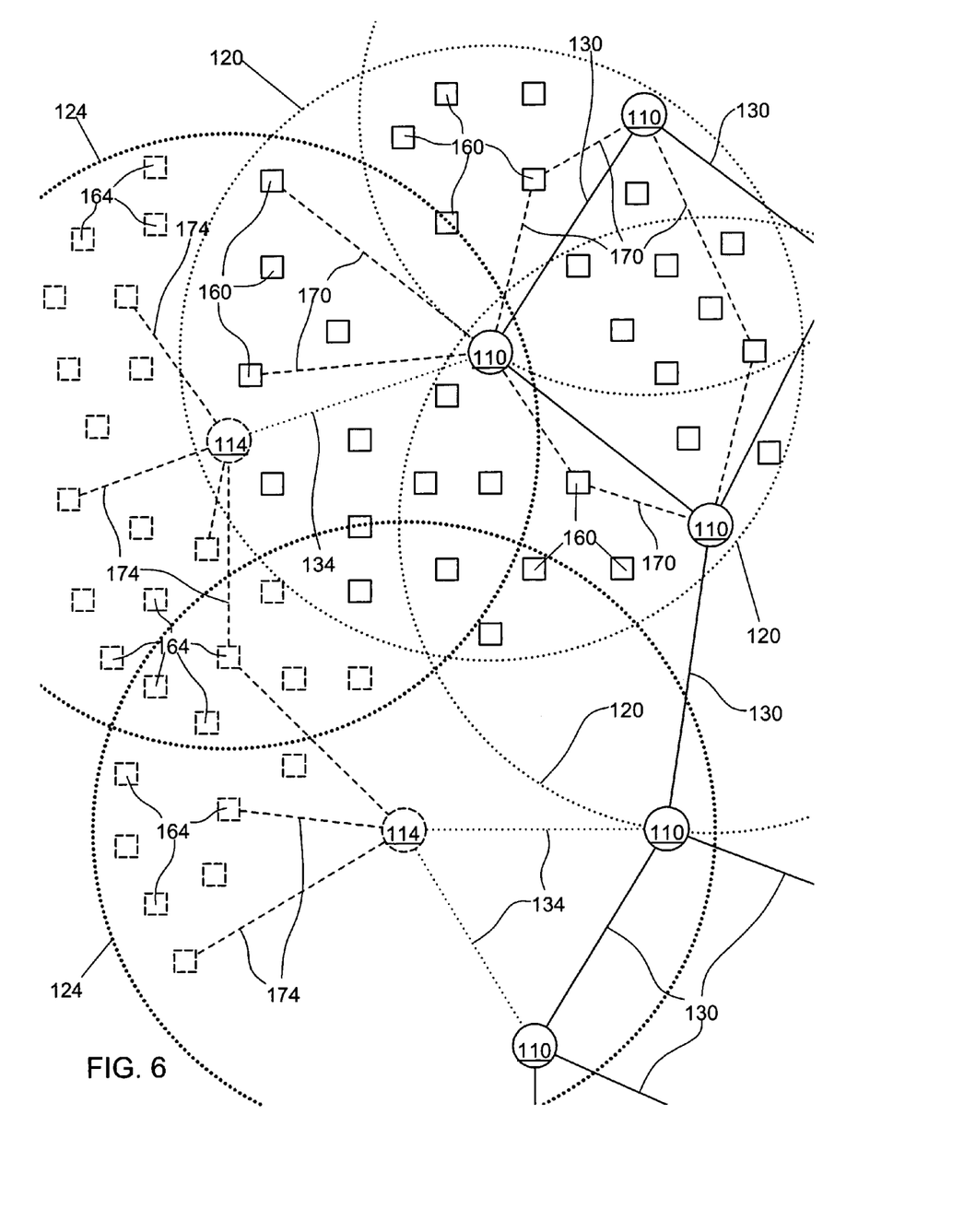
FIG. 6 shows an enlarged schematic diagram of a portion of a primary wireless network and a group of secondary wireless units.

Each secondary wireless unit is located geographically within a maximum wireless transmission range of at least one primary wireless unit, thereby enabling wireless online access to the Internet from the secondary wireless unit via the primary wireless network. FIG. 6 is an enlarged schematic diagram of a portion of a distributed wireless online access system according to the present invention. Several primary wireless units 110 (solid circles) are shown, surrounded by circles 120 (light dotted) indicating a maximum wireless transmission range and linked by wireless links 130 (solid lines) of the primary wireless network. Secondary wireless units 160 (solid squares) within circles 120 may be linked to a primary wireless unit 110 by wireless links 170 (dashed line). This of course assumes that the primary wireless unit also lies within the wireless transmission range of secondary wireless unit; this is generally but not necessarily always the case. It is preferable for each secondary wireless unit 160 to lie within more than one circle 120 (i.e., within the maximum transmission range of more than one primary wireless unit), thereby providing more than one link 170 to the primary wireless network and thence to the Internet. All of the linked secondary units 160 (solid squares) may be wirelessly linked to the primary network through one or more links 170 (dashed lines), although not all secondary wireless units 160 are thus labeled in the Figure, not all links 170 are shown, and not all links 170 that are shown are thus labeled. The labels and links not shown have been omitted for clarity of the Figure.

In addition to previously described functions, the administration unit may enable expansion of the distributed wireless online access system to cover new geographic areas with little or no extant wireless online access. The administration unit may also enable deployment of additional resources for enhancing the capacity and reliability of the wireless online access system. As shown in FIG. 6, there are locations 164 (dashed squares) that are not provided with wireless online access. The processing capabilities of the administration unit may be used to determine suitable, desirable, or optimal geographic locations for new primary wireless units 114 (dashed circles) linked to the primary wireless network through wireless links 134 (dotted lines) and each having a maximum wireless transmission range indicated by a circle 124 (heavy dotted). In this way a group of new locations 164, previously without wireless online access, are now within transmission range of a primary wireless unit 114 and may be wirelessly linked thereto by a new wireless link 174 (dashed lines), thereby providing location 164 with wireless online access according to the present invention, once a secondary wireless unit is installed and activated. Similarly, the administration unit may analyze flow patterns and flow volumes of data packets flowing through the primary wireless network, thereby revealing localized portions thereof where data packet volume is larger than average, thereby potentially slowing down the primary wireless network in that area. A desirable or optimal location for an additional primary wireless unit may be deployed in these heavy-data-packet-traffic areas and speed up the overall performance of the wireless online access system.

From a commercial standpoint, it is particularly attractive to implement a wireless online access system according to the present invention using wireless transmitters and receivers that may be operated as an unlicensed wireless device in legal compliance with any applicable government regulations in force at the location of the wireless unit. By utilizing transmitters and receivers (for both primary and secondary wireless units) in the United States that fall within regulations for unlicensed use as set forth by the FCC in Part 15 of Title 47 of the Code of Federal Regulations, for example, a provider of wireless online access may avoid many costly and time consuming regulatory hurdles and/or permit procedures. One particular class of such transmitters and receivers are specified in the group of IEEE 802.11 standards and may be used within various ranges of wireless carrier frequencies, including (but not limited to) the spectral regions around 900 MHz and 2.4 GHz. Both Part 15 of Title 47 of the Code of Federal Regulations and the IEEE 802.11 standards are hereby incorporated by reference as if fully set forth herein. Successor U.S. regulations, applicable present and/or future foreign regulation, and/or other current and/or future standards may be equivalently complied with in order to implement an unlicensed distributed wireless online access system without departing from inventive concepts disclosed and/or claimed herein.

Figure 7:
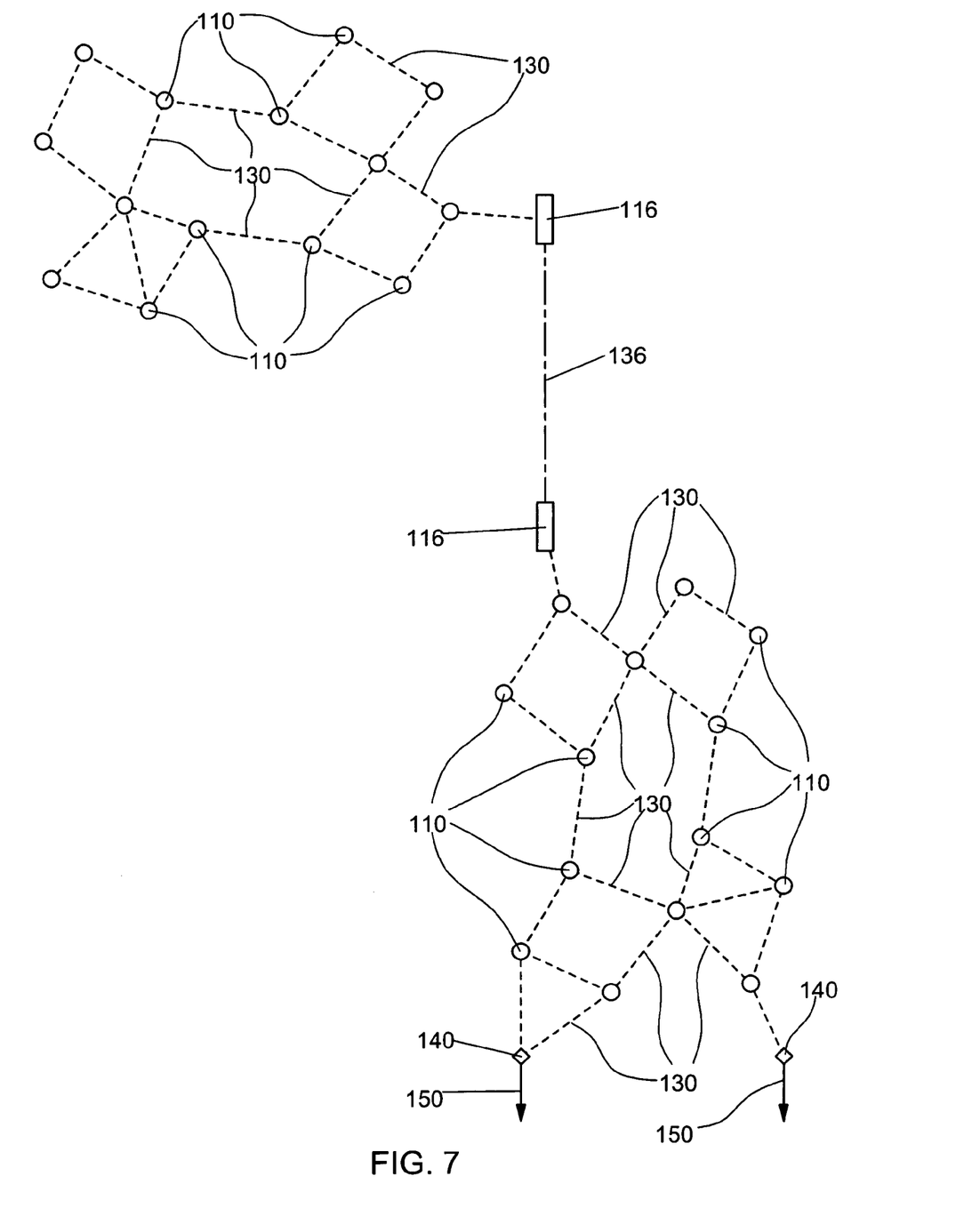
FIG. 7 shows a schematic diagram of a primary wireless network.

As an example, a non-directional transmitter having a maximum transmission range in the 150-200 meter range may fall within FCC regulations for unlicensed transmitters, and could be used to implement a primary network having a primary wireless unit roughly every city block or so. Non-directional wireless transmission may be preferred for most primary and secondary wireless units of a wireless online access system as described herein. FCC regulations may permit greater transmission ranges for unlicensed directional transmitters, perhaps as long as several kilometers. FIG. 7 illustrates use of a pair of directional transmitter/receivers 116 and a wireless link 136 therebetween for connecting geographically separated portions of a primary wireless network according to the present invention. In this way geographically more distant portions of the primary wireless network may nevertheless be provided with wireless access to portal units 140, links 150, and the Internet (or other external communications system). Without departing from inventive concepts disclosed and/or claimed herein, a distributed wireless online access system may be implemented with any suitable transmitters/receivers (licensed, unlicensed, or a combination thereof) without departing from inventive concepts disclosed and/or claimed herein. In particular, the configuration of FIG. 7 could be implemented with unlicensed wireless units 110 and licensed units 116. Further variations of the present invention may be implemented using a combination of wireless and wired network links. The system of FIG. 7, for example, could be implemented with wireless links 130, while link 136 may be a wired link. Other combinations may also fall within the scope of the present invention.

The wireless nature of the data packet transmission and reception, and the distributed nature of the hardware (computers, transmitters, and receivers) means that there are substantially no infrastructure development requirements to implement a distributed wireless online access system according to the present invention. The link between the portal unit and the Internet backbone may be established readily and economically by the common practice of "co-locating" the portal unit with an established commercial Internet service provider (ISP). A computer thus co-located and including a wireless transmitter and receiver may serve as a portal unit, and one or more primary wireless units must then be located within the maximum transmission range of the portal unit transmitter and receiver (direction or nondirectional). All primary and secondary wireless units may comprise relatively small (a few hundred cubic centimeters) transmitter and receiver units connected to personal computers (many of the computers which would already be in place). No cable or wire needs to be laid, and no large antennas or high-power broadcast equipment needs to be acquired, set up, licensed, and/or located. A distributed wireless online access system according to the present invention may be deployed and operated in a completely unobtrusive manner in any geographic area having a sufficiently dense distribution of structures (i.e., residences and/or businesses) having a sufficiently dense distribution of potential users therein to host enough primary wireless units to establish and reliably maintain the primary wireless network. In a preferred embodiment of the present invention, each wireless unit may function as both a primary wireless unit as well as a secondary wireless unit. In this way the number of online access points (secondary units) is maximized, while the number of different network paths (and hence network redundancy and reliability) through the primary wireless network (primary wireless units) is also maximized.

The relatively low cost of the hardware involved (essentially only a transmitter and receiver, since most users seeking online access presumably already have or already plan to acquire a computer), the lack of construction or infrastructure requirements, and the prospect of higher-speed online access, should combine to produce self-assembling, self-organizing growth of the wireless online access system, and may provide the basis for unique business methods for providing online access to subscribers according to the present invention. A provider of wireless online access preferably begins by establishing a portal unit with a high-speed link to the Internet, and may proceed to solicit one or more primary subscribers to locate primary wireless units at their respective locations, and who may be required to pay a primary subscriber access fee. These primary wireless units could also function as secondary wireless units for providing wireless online access to the primary subscriber. The initial primary subscribers may be given incentives to participate, such as free equipment provided, reduction or elimination of any access fees normally to be charged, and so on. Alternatively, the prospect of relatively low-cost high-speed wireless online access may be sufficient incentive for participation as a primary subscriber. The wireless online access provider may proceed to solicit secondary subscribers, who would locate secondary wireless units at their respective locations to obtain high-speed wireless online access in return for payment of a secondary subscriber access fee.

The wireless online access provider has thus established two incoming revenue streams (access fees paid by primary and secondary subscribers). Access fees may be periodic flat fees, may be based on the volume of data packets received/transmitted by a particular wireless unit (wireless data traffic volume), or may be a combination thereof. A distributed wireless online access system according to the present invention may further comprise a billing unit for tracking data-packet-volume-based subscriber access fees. The billing unit may comprise: a wireless transmitter for transmitting a data packet volume query to primary and/or secondary wireless units; a wireless receiver for receiving data packet volume data; and a programmed processor for calculating subscriber access fee amounts based on the data packet volume data. The transmitter/receiver/processor combination comprising the billing unit may preferably be the same combination of components comprising an administration unit as described hereinabove, since the same data packet volume data is used to perform both routing/re-routing and fee calculating functions. However, separate units may be employed for administration and billing functions.

The wireless online access provider enterprise may be readily expanded by adding new primary subscribers (FIG. 6) to extend the coverage area of the primary network, and then soliciting new secondary subscribers within the newly covered areas. The expansion may be facilitated and/or driven by providing financial incentives to new and/or existing primary subscribers. A primary subscriber may be paid by the wireless online access provider, through access fee rebates, reductions, or waivers, providing enhanced wireless online access, and/or by payments to the subscriber. A primary subscriber may be paid a flat periodic fee based on the number of secondary units within the transmission range of his/her primary wireless unit, therefore encouraging the primary subscriber to solicit new secondary subscribers within the coverage area on behalf of the wireless online access provider. This may be a preferred revenue/incentive method for primary networks having relatively fewer alternative pathways through the primary network (i.e., a substantially tree-like primary network topology). Alternatively, a primary subscriber may be paid a periodic flat fee based on the number of additional subscribers (primary and/or secondary) recruited by the primary subscriber, whether or not they lie within the coverage area of the recruiting primary subscriber's wireless unit. Additional payments could be made to a recruiting primary subscriber based on still more subscribers recruited by the recruited subscribers, and so on. This may be the preferred revenue/incentive method for a distributed online access system in which the primary network has a large number of alternative network pathways (i.e., a substantially web-like primary network topology). Such a highly interconnected network arises when all subscribers are primary subscribers, for example.

A similar incentive may be result from paying the primary subscriber based on the volume of in-transit data packets received, routed, and re-transmitted by the corresponding primary wireless unit. Additional incentives (flat fee or traffic-based) might be paid to a primary subscriber to host a longer-range directional transmitter or wired connection (FIG. 7), thereby facilitating more widespread expansion of the distributed wireless online access system. Any financial incentive calculated based on data packet volume may be tracked and calculated by the billing unit. Analysis of data packet volume patterns by the wireless online access provider using the administration unit of the system may allow targeted solicitation of primary subscribers in areas lacking coverage or having data packet volumes large enough to slow overall data packet flow through the primary wireless network, and additional incentives may be brought to bear to recruit potential primary subscribers thus targeted. This expansion of the wireless online access system increases the incoming revenue streams for the wireless online access provider, and may also generate net incoming revenue streams for one or more of the primary subscribers. Additional financial incentives may be paid to primary subscribers for increasing the fraction of "up-time" of their respective primary wireless units, or for upgrading the transmission speed of their respective primary wireless units. Conversely, primary subscribers whose primary wireless units are frequently unavailable or offline (low fraction of "up-time), thereby cutting off any secondary subscribers linked to the primary wireless network solely through that primary wireless unit and perhaps also hampering the overall flow of data packets through the primary wireless network, may have their financial incentives reduced. If a primary subscriber's primary wireless unit is offline too often, he/she may be unilaterally dropped as a primary subscriber by the wireless online access provider, and a new primary subscriber recruited in his/her place, if needed.

Algorithms for determining the revenue to be distributed by the wireless online access provider are many and varied. A fixed fee per recruit, perhaps decreased by a specified fraction per "generation removed" from a recruiting primary subscriber, might be paid to a primary subscriber. A fixed fee per unit data received and re-transmitted, perhaps decreased by a specified fraction per network node removed from the data source, might be paid to each primary subscriber. Primary subscribers could be sorted into hierarchical levels based on length of time in the system, number of recruits, number of network nodes removed from a portal unit, fraction of uptime, transmission speed, or any other relevant criterion, and specific (perhaps level-dependent) fractions of the overall system revenue may be distributed among primary subscribers in each level. The possibilities are endless, and any suitable scheme for revenue distribution among the primary subscribers may be employed without departing from inventive concepts disclosed and/or claimed herein.

One or more primary and/or secondary wireless units may be mobile and/or placed on motor vehicles. Mobile secondary wireless units could enable roaming between areas covered by different primary wireless units of the primary wireless network, or even into an area served by one or more other primary wireless networks. Such roaming wireless online access may be controlled/monitored by the administration unit in much the same way that roaming wireless telephone access is monitored/controlled. Roaming access may provide a basis for charging additional online access fees. Mobile primary units result in a primary network coverage area and topology that vary dynamically with the positions of the mobile primary wireless units. In this instance the administration unit must monitor the temporally evolving primary network topology in order to appropriately route and/or re-route transmission of data packets over the primary wireless network. Such a primary wireless network may be referred to as a transient primary wireless network.

By placing a few primary units of a primary wireless network near a length of roadway, the primary wireless network may be expanded to include a transient primary network portion encompassing the length of roadway. If sufficiently many motor vehicles carrying primary wireless units are on the roadway (presumably, but alas not necessarily, moving), then any vehicles carrying secondary wireless units would have high-speed online access while on the roadway. Each such vehicle-mounted mobile wireless units may function as both a primary and a secondary wireless unit. Similar subscriber recruitment, solicitation, access fees, and financial incentives may be provided as described hereinabove for deploying, maintaining, and/or generating revenue from a transient wireless online access system. A particularly attractive scenario for such a transient mobile wireless online access system might be implemented among a group of commuters using a particular arterial roadway of a major metro area. With many vehicles moving relatively slowly in a relatively closely packed distribution, and with commuters stuck in those vehicles for significant periods of time, both the feasibility and desirability of providing such a transient primary wireless network for an online access system is clear. Another scenario that could be implemented may essentially convert the Interstate highway system into a nationwide backbone for a high-speed wireless online access system. A combination of fixed primary wireless units at certain strategic points along the highway system and recruitment of vehicle operators that heavily utilize the highway system (freight trucking companies, for example) to carry primary wireless units on their vehicles would enable implementation of a nationwide wireless online access network. Such a system could serve both stationary and mobile secondary subscribers. A vehicle-based wireless network might be particularly amenable to use of directional transmitters for expanding transmission range of the wireless units, since the roadway constrains most other primary wireless units to be located in front of or behind a wireless unit on a vehicle (i.e., on the roadway). Administration units for such implementation must enable monitoring of wireless unit position, which may be accomplished using positioning systems associated with each wireless unit (a GPS receiver, for example), using wireless link and/or network status data (i.e., the locations of the wireless units may not be as important as the network topology of the wireless links between the wireless units), or by other suitable methods. Administration/routing software should preferably be adapted for routing/re-routing data packet transmission through a primary wireless network of dynamically varying topology.

While preferred implementations of the present invention have been disclosed as pertaining primarily to deploying and/or providing high-speed wireless online access, it should be noted that the present invention may find applicability in other arenas. In addition to providing high-speed wireless online access, systems, apparatus, and/or methods according to the present invention may be employed for providing other distributed wireless services, including but not limited to: voice/fax/phone service; mobile/wireless phone service; one- or two-way paging service; voice and/or text messaging service; wireless delivery of music, audio, video, multi-media, or other content; two-way-radio-type telecommunications; security systems; local- and/or wide-area network services (LAN/WAN); emergency services; traffic monitoring/management services; roadside assistance services; road condition information services; positioning/navigation services; and so on.

The present invention has been set forth in the forms of its preferred and alternative embodiments. It is nevertheless intended that modifications to the disclosed distributed wireless online access system, apparatus, and methods may be made without departing from inventive concepts disclosed and/or claimed herein.

What is claimed is:

1. A method, performed by a primary subscriber, for providing wireless online access to a secondary subscriber, comprising:
   establishing a wireless access signal space wherein a wireless communications link is established between a secondary wireless unit and at least one primary wireless unit, thereby providing a corresponding secondary subscriber with online access by data packet transmission between the primary wireless unit and the secondary wireless unit; and
   receiving, from an online access provider, a credited revenue amount, which revenue amount is credited to the primary subscriber in return for providing the secondary subscriber with online access in the wireless access signal space on behalf of the online access provider.

2. The method of claim 1, further comprising paying, to the online access provider, an access fee amount for the primary wireless unit.

3. The method of claim 1, further comprising reporting network data from the primary wireless unit, the credited revenue amount being based at least in part on the reported network data.

4. The method of claim 3, the credited revenue amount being based at least in part on volume of in-transit data packets received by and re-transmitted by the primary wireless unit, the volume being included in the reported network data.

5. The method of claim 1, further comprising:
   recruiting primary subscribers to provide online access through other primary wireless units; or
   recruiting secondary subscribers to which to provide online access through a primary wireless unit,
   the credited revenue amount being based at least in part on the number of primary subscribers recruited or the number of secondary subscribers recruited.

6. The method of claim 1, the primary wireless unit also being a secondary wireless unit.

7. The method of claim 1, further comprising establishing a communications link between at least one primary wireless unit and an external communications network through a portal unit, the portal unit including:
   a link to the external communications system for receiving a data packet transmitted therefrom and transmitting a data packet thereto; and
   a link to at least one primary wireless unit for receiving a data packet transmitted therefrom and transmitting a data packet thereto.

8. The method of claim 7, the external communications system comprising the Internet.

9. The method of claim 7, the link to the external communications system including a wired link.

10. The method of claim 7, the link to the external communications system including a wireless link.

11. The method of claim 10, the link to the external communications network including at least one other primary wireless unit.

12. The method of claim 7, the link to the primary wireless unit comprising a wired link.

13. The method of claim 7, the link to the primary wireless unit comprising a wireless link.

14. The method of claim 13, the link to the primary unit including at least one other primary wireless unit.

15. The method of claim 1, at least one primary wireless unit being an unlicensed wireless device in legal compliance with government regulations applicable at the location of the primary wireless unit.

16. The method of claim 15, at least one primary wireless unit being an unlicensed wireless device in legal compliance with Part 15 of Title 47 of the Code of Federal Regulations.

17. The method of claim 15, at least one primary wireless unit conforming to an IEEE 802.11 standard.

18. The method of claim 17, at least one secondary wireless unit conforming to an IEEE 802.11 standard.

19. The method of claim 15, at least one primary wireless unit including a directional transmitter.

20. The method of claim 15, at least one secondary wireless unit being an unlicensed wireless device in legal compliance with government regulations applicable at the location of the secondary wireless unit.

21. The method of claim 1, at least one primary wireless unit being a mobile wireless unit.

22. The method of claim 1, at least one secondary wireless unit being a mobile wireless unit.

23. The method of claim 3, the credited revenue amount being based at least in part on a number of other primary wireless units within the maximum transmission range of the primary wireless unit and for which the primary wireless unit is within the maximum transmission range thereof, the number of such other primary wireless units being included in the reported network data.

24. The method of claim 3, the credited revenue amount being based at least in part on a number of secondary wireless units within the maximum transmission range of the primary wireless unit and for which the primary wireless unit is within the maximum transmission range thereof, the number of such secondary units being included in the reported network data.

* * * * *